United States Patent
Sutehall et al.

(10) Patent No.: US 6,337,439 B1
(45) Date of Patent: *Jan. 8, 2002

(54) LIMITING ELECTRICAL DEGRADATION OF ALL-DIELECTRIC SELF SUPPORTING CABLES

(75) Inventors: Ralph Sutehall; Ian Dewi Lang, both of Gwent (GB)

(73) Assignee: Pirelli General plc, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,297

(22) Filed: Mar. 4, 1999

(30) Foreign Application Priority Data

Mar. 5, 1998 (GB) .............................................. 9804698

(51) Int. Cl.[7] .............................................. H02G 15/02
(52) U.S. Cl. ........................................ 174/74 A; 174/92
(58) Field of Search .............................. 174/74 R, 74 A, 174/77 R, 23 R, 92, 102 D, 78, 75 B, 80, 144, 138 F

(56) References Cited

U.S. PATENT DOCUMENTS

| | | | |
|---|---|---|---|
| 3,728,466 A | | 4/1973 | Rocton et al. ............ 174/23 R |
| 4,376,229 A | * | 3/1983 | Maul et al. ......... 174/102 D X |
| 4,963,698 A | * | 10/1990 | Chang et al. ............. 174/77 R |
| 5,373,100 A | * | 12/1994 | Arroyo et al. ............ 174/23 R |
| 5,432,299 A | * | 7/1995 | Ochi ........................ 174/74 A |
| 5,451,717 A | * | 9/1995 | Itou .......................... 174/77 R |
| 5,696,351 A | * | 12/1997 | Benn et al. .................. 174/92 |
| 5,783,778 A | * | 7/1998 | Foss et al. ................ 174/77 R |
| 5,902,957 A | * | 5/1999 | Takahashi et al. ............ 174/36 |
| 6,100,472 A | * | 8/2000 | Foss .......................... 174/77 R |

FOREIGN PATENT DOCUMENTS

| | | |
|---|---|---|
| FR | 2097687 | 3/1972 |
| GB | 2 178 602 A | 2/1987 |
| GB | 2 256 284 A | 2/1992 |
| GB | 2 264 813 A | 9/1993 |
| GB | 2 298527 A | 9/1996 |

OTHER PUBLICATIONS

C.N. Carter, "Arc control devices for use on all–dielectric self–supporting, optical cables", IEE Proceedings–A, vol. 140, No. 5, pp. 357–361, (1993).

Oestreich et al., "Self–Supporting Dielectric Fiber Optic Cables In High Voltage Lines", International Wire & Cable Symposium Proceedings, pp. 79–82, (1988).

C.N. Carter, "Dry Band Electrical Activity on Optical Cables Separately Strung on Overhead Power Lines", International Wire & Cable Symposium Proceedings, pp. 117–121 (1988).

Nichols et al., "A Novel System for the Installation of All–Dielectric Self–Supporting Optical Cable on High Voltage Overhead Power Lines", International Wire & Cable Symposium Proceedings, pp. 771–777, (1995).

Y. Toshihiro, "Anchoring Device for Optical Cable", Patent Abstracts of Japan of JP09171131 (Jun. 30, 1997).

* cited by examiner

*Primary Examiner*—Chau N. Nguyen
(74) *Attorney, Agent, or Firm*—Finnegan, Henderson, Farabow, Garrett & Dunner, L.L.P.

(57) ABSTRACT

A device 22 for use adjacent an earthed suspension region 20 of an all-dielectric self-supporting cable 10 suspended in an electric field at the region 20 from a tower or the like for limiting dry band arcing adjacent the region 20 is disclosed. The device includes members 34, 36 for defining a sleeve 26 for fitting to the cable adjacent this region 20 and elements 38, 40, 42, 44 for defining two closures 28, 30 for the sleeve. These closures are engageable with the cable at longitudinally spaced apart locations for forming with the cable and sleeve a closed zone 32 between the closures. Use of the device maintains the outer surface of the cable dry over a portion 24 thereof adjacent the region 20 which would otherwise be susceptible to dry band arcing.

10 Claims, 2 Drawing Sheets

LIMITING ELECTRICAL DEGRADATION OF ALL-DIELECTRIC SELF SUPPORTING CABLES

BACKGROUND OF THE INVENTION

This invention relates to limiting electrical degradation of all-dielectric self-supporting (ADSS) cables.

When ADSS cables are suspended from towers from which power transmission lines are also suspended, they can suffer from electrical degradation caused by dry band arcing.

Dry band arcing arises since there is an induced voltage gradient along the length of the ADSS cable and although this voltage gradient does not present a problem if the cable is dry, if the cable surface becomes electrically conductive due to moisture thereon a current is drawn along the length of the cable. This current is greatest at the tower where the cable is suspended and at earth potential and will dry the cable surface leading to a break in the previously continuously electrically conductive surface. This break can extend around the cable to form a dry band and arcing across the dry band can degrade the cable.

SUMMARY OF THE INVENTION

An object of this invention is to limit such dry band arcing adjacent the earthed suspension regions of ADSS cables.

Briefly this is achieved by maintaining the outer surface of the cable dry over a portion thereof adjacent the earthed suspension region.

In an article entitled Arc control devices for use on all-dielectric self-supporting optical cables' in IEE Proceedings-A, Vol. 140, No. 5, September 1993 to which reference is directed there is disclosed a rain shield for shielding an ADSS cable from rain adjacent an earthed suspension region. This rain shield comprises a cylinder fitted to the cable adjacent the earthed suspension region so that the cable runs along the axis of the cylinder. The end of the cylinder closest to the earthed suspension region is closed and the opposite, or span, end is open. It is stated that if the ratio of the shield length to the annular gap between the shield is high enough, say by a factor of ten, ingress of rain and the deposition of pollutant will be successfully prevented. However, it is acknowledged that atmospheric condensation such as fog or dew will still be deposited on the inside of the shield. Such condensation will also be deposited on the cable inside the shield providing conditions for dry band arcing.

The present invention enables the provision of a more certain way of preventing the cable adjacent the earthed suspension region becoming wet either through rain or condensation.

The invention provides a device for use adjacent an earthed suspension region of an all-dielectric self-supporting cable suspended in an electric field at said region from a tower or the like for limiting dry band arcing adjacent said region, said device comprising means for defining a sleeve for fitting to the cable adjacent said region and means for defining two closures for the sleeve, which closures are engageable with the cable at longitudinally spaced apart locations for forming with the cable and sleeve a closed zone between the closures.

The invention also includes an installation comprising an all-dielectric self-supporting cable suspended at an earthed suspension region thereof in an electric field, from a tower or the like having a device as defined in the last preceding paragraph fitted to the cable adjacent said earthed region.

Preferably, the device is axially split for ease of installation and in this case the means for defining the sleeve comprises at least two hinged or separate members fittable together to form said sleeve. In this case, the two closures may comprise respective elements connected to said members.

The device advantageously further comprises clamp means for clamping said members together when they are fitted together to form said sleeve.

Each of said closures may be provided with or comprise a resilient seal means for sealingly engaging the cable when said sleeve is fitted to said cable. At least one, and preferably each, of said seals means may comprise a plurality of deformable fins for sealingly engaging the cable at longitudinally spaced apart locations.

In each of the illustrated embodiments, one of said closures is provided at one end portion of said sleeve and the other of said closures is provided intermediate said one end portion and the opposite end portion of the sleeve, which opposite end portion is open. In one of these embodiments the open end portion flares radially outwardly towards its free end.

Advantageously, the external surface of at least a portion of said sleeve comprises radially extending surface portions. To this end, said portion of the sleeve may have the configuration of a bellows.

Preferably, at least the means for defining said sleeve are formed from a hydrophobic, electrically insulating material.

The invention also includes an installation comprising an all-dielectric self-supporting cable suspended at an earthed suspension region thereof in an electric field from a tower or the like having a device comprising a sleeve and two closures therefor fitted to the cable adjacent said region, said closures engaging the cable at two spaced apart locations therealong and forming with the cable and sleeve a closed zone between the closures.

In the illustrated embodiments, one of said closures is provided at an end of said sleeve closest to the earthed suspension region and the other of said closures is provided intermediate said end and an end of the sleeve remote from the said region, the end of the sleeve remote from said region being open.

The invention also includes a method of limiting dry band arcing adjacent an earthed suspension region of an all-dielectric self-supporting cable suspended at said region in an electric field from a tower or the like, comprising maintaining the outer surface of the cable dry over a portion thereof adjacent the earthed suspension region by sealing off said portion from the environment.

In order that the invention may be better understood, two embodiments thereof, which are given by way of example only, will now be described with reference to the accompanying drawings, in which:

DESCRIPTION OF THE PREFERRED EMBODIMENT(S)

Figure 1:
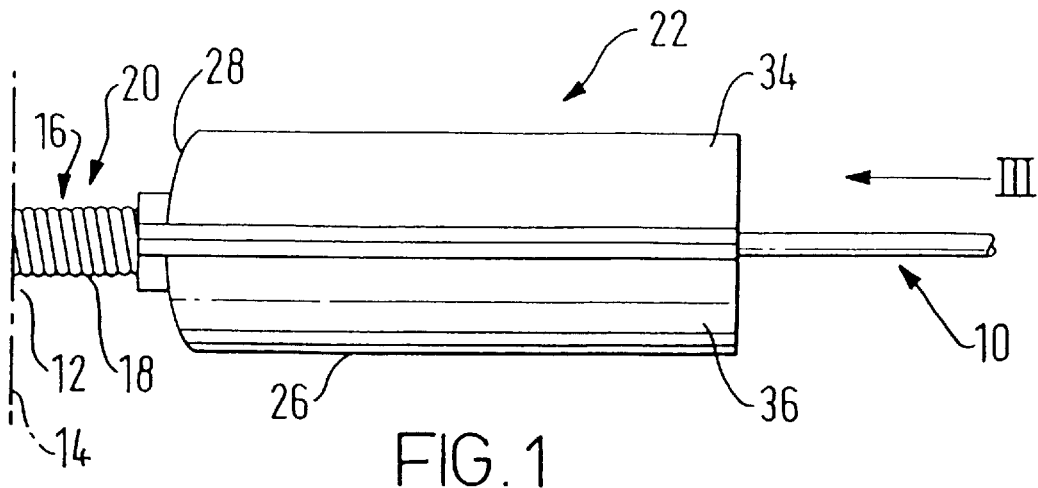
FIG. 1 is a schematic side view of a device forming a first embodiment shown installed on an ADSS cable adjacent an earthed suspension region thereof.
Figure 2:
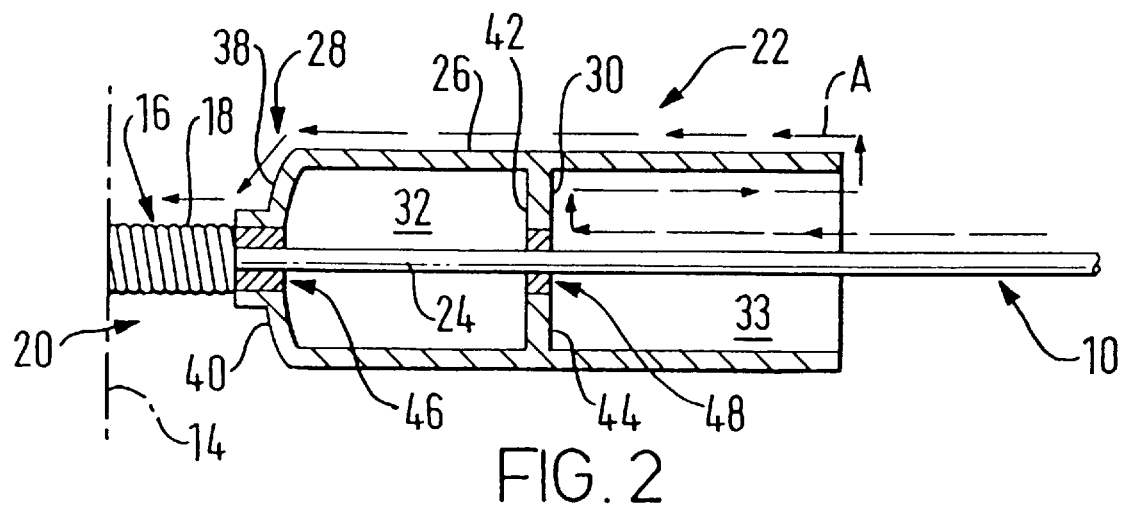
FIG. 2 is a view similar to that of FIG. 1, but with the device shown in axial cross-section.
Figure 3:
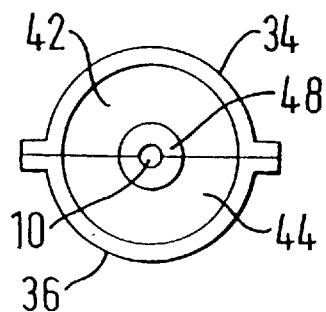
FIG. 3 is a view taken in the direction of arrow III in FIG. 1.

Referring first to FIGS. 1 to 3 there is shown a portion of an all-dielectric self-supporting cable 10 disposed to one side of a location 12 on the cable at which the cable is supported by means of a suspension device (indicated by chain dotted line) 14 attached to a tower (not shown) from which a power transmission cable (not shown) is also suspended. The arrangement to the other (left hand as viewed in FIG. 1) side of the location 12 is substantially the same.

The cable 10 is provided with mechanical reinforcement 16 which is formed by one or more helically wound metallic members 18 and which extends to each side of the above-mentioned location 12. This reinforcement 16 is provided to spread the load imposed by the suspension device 14 on the cable and is at earth potential providing an earthed suspension region 20 of the cable.

In order to limit dry band arcing adjacent the earthed suspension region 20, a device 22 is fitted to the cable 10 adjacent region 20 in order to maintain a portion 24 of the cable dry by sealing off that portion 24 from the environment.

The device 22 comprises a sleeve 26 provided with two closures 28, 30 which engage the cable 10 at longitudinally spaced apart locations and form with the cable and sleeve a closed, or 'dry', zone 32 between the closures for the portion 24 of the cable which is to be maintained dry.

To facilitate fitting of the device 22 to the cable 10, the device is axially split and the sleeve is formed by at least two hinged or separate members 34, 36 which are fittable together about the cable.

Closure 28 comprises respective elements 38, 40 connected to members 34, 36 and closure 30 comprises respective members 42, 44 connected to members 34, 36.

Whilst the members 34, 36 may be simply snap fittable together to form the sleeve, advantageously additionally or alternatively one or more clamps circumscribing the sleeve may be provided to secure these members together.

Each of the closures 28, 30 is provided with a respective resilient seal 46, 48 for sealingly engaging the cable when the sleeve is fitted to the cable. The seal for each closure comprises respective portions connected to the elements of that closure.

As shown in FIG. 2, the closure referenced 28 is provided at the end portion of the sleeve 26 closest to the earthed suspension region 20 and the closure referenced 30 is provided intermediate that end portion and the opposite end portion which is left open. Thus the device provides in addition to the closed or 'dry' zone 32, an open zone 33.

Figure 4:
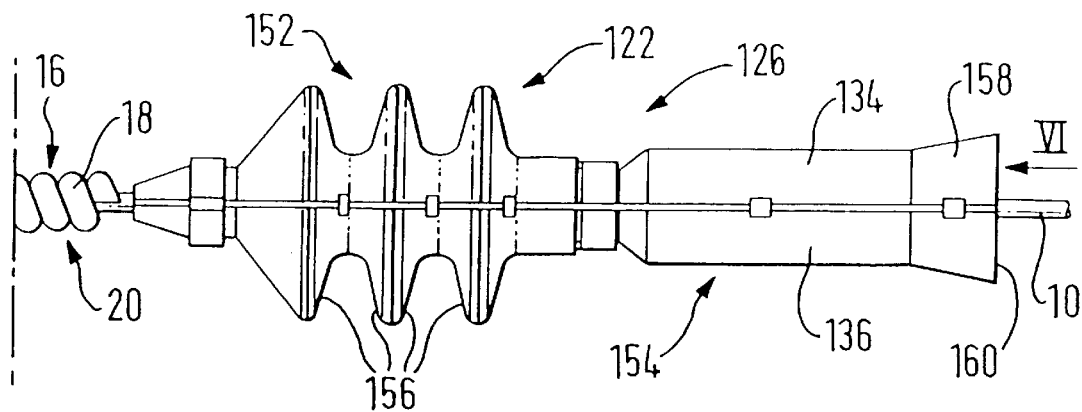
FIG. 4 is a schematic side view of a device forming a second embodiment shown installed on an ADSS cable adjacent an earthed suspension region thereof.
Figure 5:
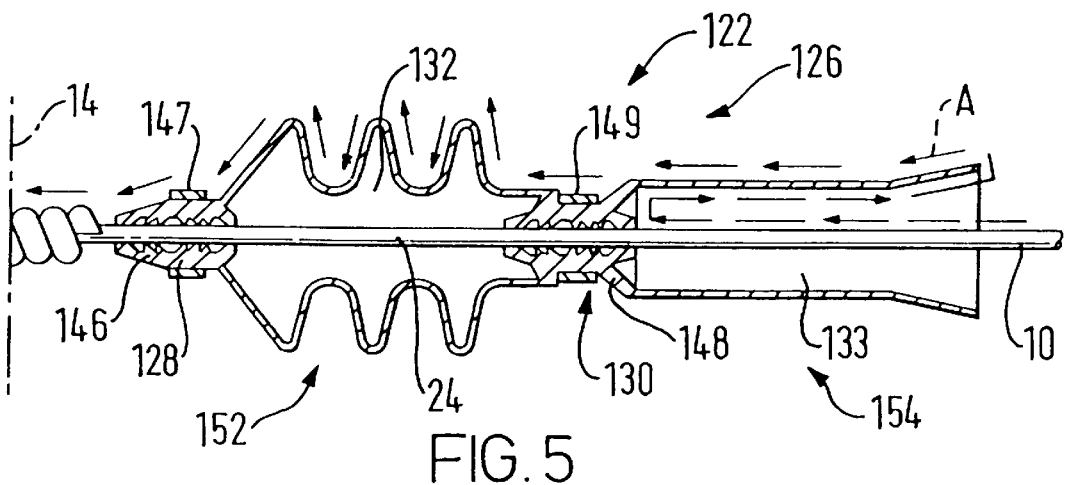
FIG. 5 is a view similar to that of FIG. 4, but with the device shown in axial cross-section.
Figure 6:
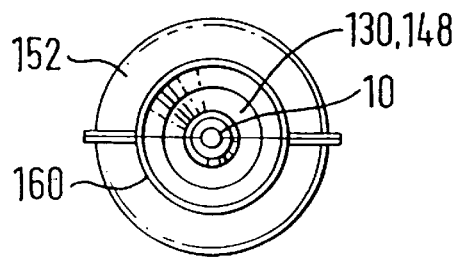
FIG. 6 is a view taken in the direction of arrow VI in FIG. 4.

FIGS. 4 to 6 illustrate an alternative embodiment and parts in these figures which correspond to parts in FIGS. 1 to 3 have been given like references increased by 100.

The device 122 is generally similar to the device 22 and comprises a sleeve 126 provided with two closures 128, 130 formed by respective seals 146, 148 which sealingly engage the cable 10 at longitudinally spaced apart locations to form with the cable and sleeve a closed zone 132 for the portion 24 of the cable which is to be maintained dry. The sleeve and closures/seals are axially split as disclosed in relation to the first embodiment and similarly one closure 128 is proved at the end portion of the sleeve closest to the earthed suspension region 20 and the other closure 130 is provided intermediate that end portion and the opposite end portion which is left open. Each of the seals 146, 148 comprises a plurality of deformable fins or ribs which extend circumferentially about the cable for sealing engaging the cable at spaced apart locations. Respective clamps 147, 149 extend about the seals 146, 148 to clamp them and thus the sleeve members 134, 136 to which they are connected to the cable. Alternatively, the clamps may extend about portions of the sleeve which engage radially outer portions of the seals.

In this embodiment the sleeve comprises two longitudinally adjacent portions 152 and 154. Portion 152 extends between the closures 128, 130 and defines a closed or 'dry' zone 132, and portion 154 extends from the intermediate closure 130 to the open end of the sleeve and defines an open zone 133. As illustrated, portion 152 of the sleeve has the configuration of a bellows, thereby providing the external surface of this portion of the sleeve with radially extending surface portions 156. Portion 154 has a constant circular cross-section throughout except for its open end portion 158 which flares radially outwardly towards its free end 160.

The longitudinal portions 152 and 154 of the sleeve may be formed separately and connected together by or with the closure 130 during fitting of the device.

In both of the above-described embodiments at least the members which form the sleeve of the device are preferably formed from a hydrophobic, electrically insulating material such as a fluoro polymer.

The closed zones 32, 132 formed by the respective devices may extend between 30% and 70% of the length of the device and in the illustrated embodiments they extend approximately half of this length. The length of the sleeve portions from the intermediate closure 30, 130 to the open end is preferably at least five times the average width of the annular gap between the cable and this sleeve portion—ie in the open zone. The minimum width of this annular gap is at least 75% of the diameter of the cable. Typically, for a ADSS cable having an outside diameter of 15 mm the device 22, 122 is from a half to one meter long; the length of the closed or 'dry' zone is about half the length of the whole device; and the minimum width of the annular gap in the open zone 33, 133 is 12½ mm.

Operation of the devices will now be described with particular references to FIGS. 2 and 5.

Firstly, it will be appreciated that if the surface of the cable is dry no current will flow along its length. If, however, the cable surface becomes wet current will flow towards the earthed suspension region 20 because of the voltage gradient. Typically the electric field adjacent region 20 due to adjacent power cables (not shown) is 10 kV and above, for example, 20 kV.

The devices 22, 122 are provided to maintain the outside of the cable dry over the portion 24 of the length of the cable adjacent the earthed suspension regions 20 and disposed in the closed or 'dry' zone 32, 132 provided by the device in order to prevent dry band arcing on that portion.

The portion of the device 22, 122 which defines the open zone 33, 133 functions in the same way as the rain shield discussed above. That is it substantially shields the cable within the open zone from rain but does not prevent condensation being deposited on the cable. However, the open zone is spaced sufficiently from the earthed suspension region 20 that dry band arcing will not occur on the portion of the cable disposed within the open zone when that portion is wet. Current will flow as indicated by arrows A in FIGS. 2 and 5 along the wet cable within the open zone 33, 133; along the inside of the sleeve portion defining the open zone; and along the whole of the outside of the sleeve to the earthed suspension region 20. Dry band arcing may occur on the outer surface of the sleeve adjacent the region 20, but this degrades the device, which is easily replaceable, rather than the ADSS cable 10.

The bellows configuration of the portion 152 of the sleeve provides a tortuous path for the flow of current between the cable and the earthed suspension region.

If the sleeve is formed from a hydrophobic material, the inside of the sleeve should remain sufficiently dry to prevent the flow of current therealong. However, the outside of the sleeve may in time lose its hydrophobic characteristics due to exposure to the environment and when wet will be at earth potential. Thus in this case, the annular gap between the free open end of the sleeve and the cable should be large enough to prevent arcing thereacross.

From the foregoing it will be appreciated that the use of the device as described maintains the outer surface of the cable dry over a portion thereof adjacent the earthed suspension region which portion would be susceptible to dry band arcing if wet.

What is claimed is:

1. An installation comprising:
    an all-dielectric self-supporting cable suspended at an earthed suspension region thereof in an electric field from a tower; and
    a device fitted to the cable adjacent said earthed region, said device comprising:
        a sleeve fitted to the all-dielectric self-supporting cable, and
        two closures for the sleeve engaged with the cable at longitudinally spaced apart locations thereby forming with the cable and the sleeve a closed zone between the closures for limiting dry band arcing;
        wherein one of said closures is provided at a first end of said sleeve closest to the earthed suspension region;
        wherein the other of said closures is provided intermediate said first end and a second, open end of the sleeve remote from said region to form an open zone between said other closure and said open end of the sleeve;
        and wherein there is an annular gap of at least 75% of the diameter of the cable between the cable and the sleeve in said open zone.

2. An installation as claimed in claim 1, wherein said device is axially split such that said sleeve comprises at least two hinged or separate members fittable together to form said sleeve.

3. An installation as claimed in claim 2, wherein said two closures comprise respective elements connected to said members.

4. An installation as claimed in claim 2, further comprising at least one clamp for clamping said members together when they are fitted together to form said sleeve.

5. An installation as claimed in claim 1, wherein at least one of said resilient seals comprises a plurality of deformable fins for sealingly engaging the cable at longitudinally spaced apart locations.

6. An installation as claimed in claim 1, wherein said open end portion flares radially outwardly towards its free end.

7. An installation as claimed in claim 1, wherein the external surface of at least a portion of said sleeve comprises radially extending surface portions.

8. An installation as claimed in claim 7, wherein said portion of the sleeve has the configuration of a bellows.

9. An installation as claimed in claim 1, wherein said sleeve is formed from a hydrophobic, electrically insulating material.

10. An installation as claimed in claim 1, wherein each of said closures comprises a resilient seal sealingly engaging the cable.

* * * * *